(No Model.)
W. J. McCAUSLAND.
OPTICAL ATTACHMENT FOR PRINTING TELEGRAPHS.
No. 270,907. Patented Jan. 23, 1883.
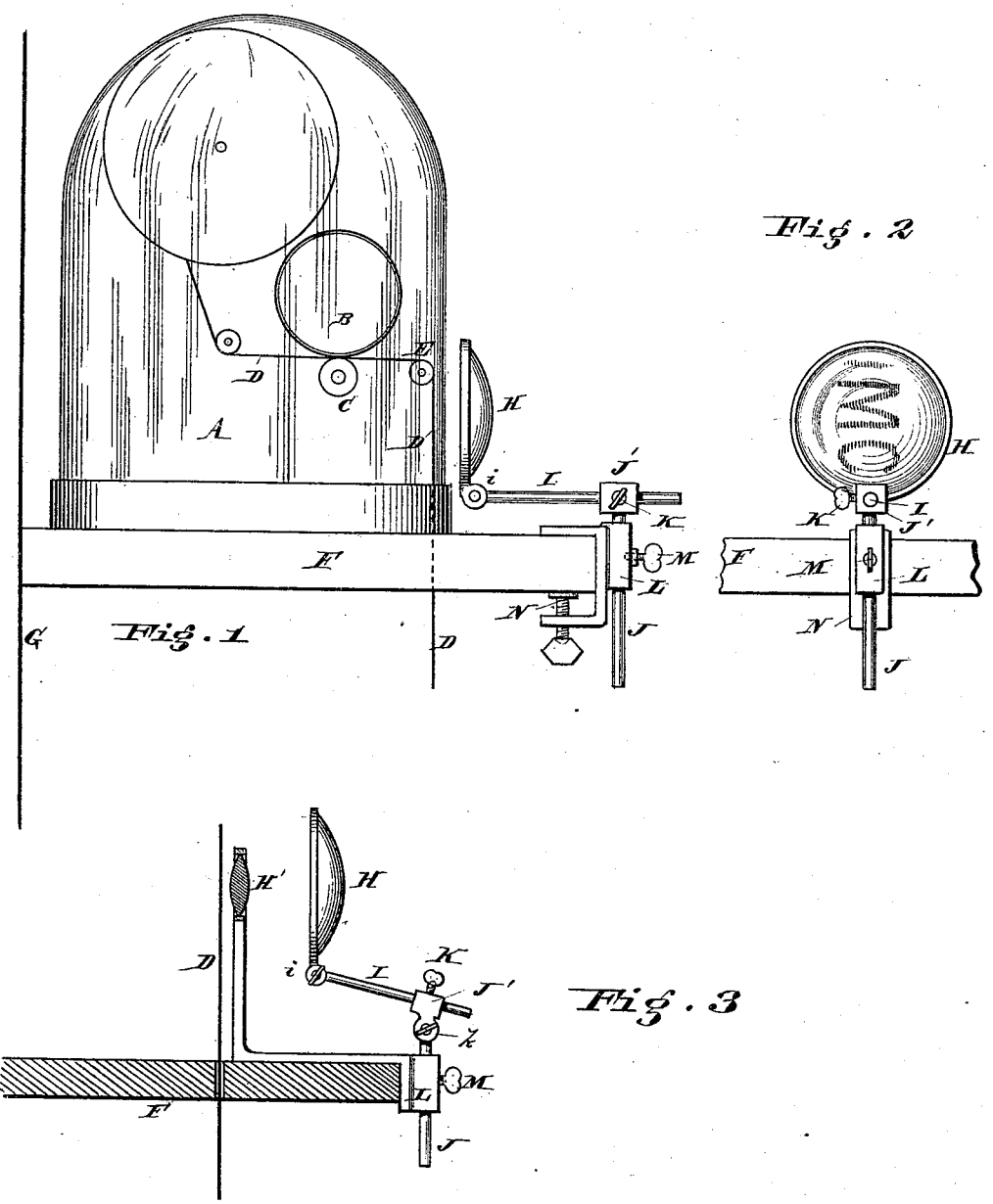

United States Patent Office.

WILLIAM J. McCAUSLAND, OF PHILADELPHIA, PENNSYLVANIA, ASSIGNOR TO WILLIAM W. KURTZ, OF SAME PLACE.

OPTICAL ATTACHMENT FOR PRINTING-TELEGRAPHS.

SPECIFICATION forming part of Letters Patent No. 270,907, dated January 23, 1883.

Application filed March 30, 1882. (No model.)

*To all whom it may concern:*

Be it known that I, WILLIAM J. McCAUSLAND, of the city and county of Philadelphia, and State of Pennsylvania, have invented an Improvement in an Attachment for Printing-Telegraphs, of which the following is a specification.

My invention has reference to printing-telegraphs; and it consists in providing the receiving or printing instrument with one or more lenses or magnifying-glasses, said lens or lenses being arranged before the printed strip or web of paper, which passes, after being printed, behind the said lenses; further, in combining said lens or lenses with a receiving-instrument of a printing-telegraph, and means to adjust said lens or lenses with respect to said printing-instrument; and in minor details of construction, all of which are fully set out in the following specification, and shown in the accompanying drawings, which form part thereof.

The object of my invention is to provide means to enable a large number of brokers or speculators to read the message at one time and without being close to the printing-machine, and thereby enable all to know at once the quotations. As now used, only two or three persons can read the printed quotations at once.

In the drawings, Figure 1 is a side elevation of my improvement. Fig. 2 is a front elevation of same, with the receiver of the printing-telegraph removed. Fig. 3 is a modified form of the lenses and their supports.

A is the receiver of the printing-telegraph, in which B is the type-wheel, C the press wheel or pad, E a guide-wheel, and D the tape or web upon which the message or quotation is printed. This receiver stands upon a board or support, F, and the tape D is fed down through a hole in same, as shown. To the board F is clamped the frame N, provided with the hub L, through which a vertical rod, J, works, and is clamped by a thumb-screw, M. The top of rod J is provided with a head, J', through which a horizontal rod, I, slides, and is clamped in position by a thumb-screw, K. Hinged to the end of rod I, at *i*, is the magnifying glass or lens H. By this construction the lens may be adjusted in front of the tape, as it is capable of universal adjustment. A person standing fifteen feet away from the lens can read the magnified quotations easily. Hence a crowd standing in front of the machine and lens may all read the message at the same time.

If desired, the lens may be hinged to the wall G, or two lenses may be used, as shown in Fig. 3. In this case a small lens, H', is set close to the moving tape and the printed matter is magnified, and the rays pass through a second lens, H, as before described, to increase the magnifying effect. To obtain still more adjustment to the lens H, the head J' may be hinged, as at *k*, to the top of rod J. The small lens H' may also be adjustable.

I do not limit myself to any particular construction of lens or lenses, nor to their supports, as they may be varied or modified in many ways, as my invention consists broadly in the adaptation of the magnifying means applied to a printing-telegraph, to enlarge or magnify the printed symbols or characters, and thereby enable a large number of persons to read said symbols or characters at the same time.

Having now described my invention, what I claim, and desire to secure by Letters Patent, is—

1. In an attachment for printing-telegraphs, the combination of means to magnify the printed characters upon the moving printed tape to enable a large number of persons to read the said characters at the same time, with guides to cause said printed tape to pass at a uniform distance from said magnifying means, substantially as and for the purpose specified.

2. In an attachment for printing-telegraphs, the combination, with one or more lenses arranged in front of the moving printed tape in said printing telegraphic instrument, of stationary guides to cause said tape to pass at a uniform distance from said lenses and in their rear, substantially as and for the purpose specified.

3. In an attachment for a printing-telegraph, the combination of means to guide the printed tape, one or more magnifying-lenses arranged in front of said guides, and means to adjust said lenses, substantially as and for the purpose specified.

4. In an attachment for a printing-telegraph, guides for the tape D', in combination with lens H, rod I, head J', rod J, clamp N L, and clamp-screws M K, substantially as shown.

5. In an attachment for a printing-telegraph, the combination of guides for the tape D, and lenses H and H', with adjustable means to support them relatively to the tape, substantially as shown.

In testimony of which invention I hereunto set my hand.

WILLIAM J. McCAUSLAND.

Witnesses:
R. S. CHILD, Jr.,
R. M. HUNTER.